United States Patent [19]
Watanabe et al.

[11] Patent Number: 5,541,437
[45] Date of Patent: Jul. 30, 1996

[54] ACCELERATION SENSOR USING MIS-LIKE TRANSISTORS

[75] Inventors: Takamoto Watanabe, Nagoya; Shigeru Nonoyama, Nishikamo-gun; Yukihiro Takeuchi, Seto, all of Japan

[73] Assignee: Nippondenso Co., Ltd., Kariya, Japan

[21] Appl. No.: 404,295

[22] Filed: Mar. 14, 1995

[30] Foreign Application Priority Data

Mar. 15, 1994 [JP] Japan .................................. 6-071698
Aug. 29, 1994 [JP] Japan .................................. 6-228740

[51] Int. Cl.$^6$ .................................................. H01L 29/82
[52] U.S. Cl. .......................... 257/417; 257/418; 257/420; 73/514.160; 73/514.220; 73/514.290; 73/514.360; 73/DIG. 1
[58] Field of Search .................................... 257/417, 418, 257/420; 73/DIG. 1, 514.160, 514.360, 514.370, 514.380, 514.290, 514.210, 514.220, 514.230

[56] References Cited

U.S. PATENT DOCUMENTS

| | | | |
|---|---|---|---|
| 4,571,661 | 2/1986 | Hoshino | 257/418 X |
| 5,095,750 | 3/1992 | Suzuki et al. | 73/514.26 |
| 5,103,279 | 4/1992 | Gutteridge | 257/417 X |
| 5,285,097 | 2/1994 | Hirai | 257/418 X |
| 5,314,572 | 5/1994 | Core et al. | 216/17 |
| 5,326,726 | 7/1994 | Tsang et al. | 437/228 |

FOREIGN PATENT DOCUMENTS

| | | |
|---|---|---|
| 0194953 | 4/1990 | European Pat. Off. . |
| 1253657 | 10/1989 | Japan . |
| 2134570 | 5/1990 | Japan . |

OTHER PUBLICATIONS

Core, et al: "Fabrication Technology for an Integrated Surface-Micromachined Sensor", Solid State Technology, Oct. 1993, pp. 39–47.
Dunn, et al: "Automotive Silicon Sensor Integration", SAE Technical Paper Series, 920471, pp. 1–6, Feb. 24–28, 1992.
Payne, et al: "Surface Micromachined Accelerometer: A Technology Update", SAE 910496, Feb. 25, 1991, pp. 127–135.
Nathanson, et al: "The Resonant Gate Transistor", IEEE Trnasactions On Electron Devices, vol. Ed–14, No. 3, Mar. 1967 pp. 117–133.
Nathanson, et al: "A Resonant—Gate Silicon Surface Transistor with High–Q Band–Pass Properties", Applied Physics Letters, vol. 7, No. 4, Aug. 15, 1965 – pp. 84–86.

*Primary Examiner*—William Mintel
*Attorney, Agent, or Firm*—Cushman, Darby & Cushman

[57] ABSTRACT

In an acceleration sensor having movable gates and a movable electrode and having a signal processing portion, the movable gates generate a differential voltage from acceleration in one direction and its output signal is fed back to the movable electrode. The balance of the movable portion is kept using an electrostatic force which cancels the acceleration acting on the movable portion, and signal detection is stabilized using closed loop control. Since signal detection is on a differential basis, acceleration can be detected in only one direction. Since a change in current is detected as a voltage difference, no carrier wave is required. Since MISFETs having movable gates are formed in pairs, there is no influence of temperature drifts. The use of a differential signal similarly cancels the influence of fluctuations of the power supply. Configuration of an acceleration sensor is thus simplified.

19 Claims, 8 Drawing Sheets

ACCELERATION SENSOR USING MIS-LIKE TRANSISTORS

CROSS REFERENCE TO RELATED APPLICATIONS

This application is based upon and claims priorities of Japanese Patent Applications No. 6-71698 filed Mar. 15, 1994 and No. 6-228740 filed Aug. 29, 1994, the contents of which are incorporated herein by reference.

BACKGROUND OF THE INVENTION

1. Field of the Invention

The present invention relates to an acceleration sensor and, more particularly, to a MISFET (metal insulator semiconductor Field Effect Transistor) type semiconductor acceleration sensor having movable gate electrodes which can preferably be used for control systems for vehicles such as air bag control systems, ABS (antilock brake systems) and navigator systems, and for yaw rate sensing and pressure detection.

2. Related Art

Recently, there are increasing demands for more compact acceleration sensors (hereinafter referred to as G sensors) for automobiles at lower costs, in response to which single-chip G sensors have been prototyped using micromachining techniques. The Single-chip G sensors have a configuration wherein a mechanical structure is formed on a semiconductor substrate to directly process signals using an electrical circuit. An example of such a device is disclosed in U.S. Pat. No. 5,314,572 (Japanese PCT patent publication No. H4-504003, wherein a movable electrode serving as a weight is provided to form a differential capacitor, thus establishing a servo system and wherein an output signal is obtained by detecting acceleration acting on the movable electrode using a carrier wave.

It has been Droposed in Japanese Patent Application No. H5-322353 that a closed-loop controlled acceleration sensor which utilizes a capacitor or MISFET (Metal Insulator Semiconductor Field Effect Transistor) as a detection element and which includes a member for generating an electrostatic force to resist an acceleration force which acts on a movable portion to maintain the movable portion in position by canceling the displacement of the movable portion.

Further, in Japanese Patent Application No. H5-322348, it has also been proposed that an acceleration sensor having an arrangement wherein a movable portion is moved horizontally relative to the substrate to prevent it from being twisted and wherein acceleration is detected from changes in the amount of the current flowing through a MISFET.

According to the methods disclosed in the above U.S. Patent, however, the level of the output signal is low and the device can not be made compact, because the sensing device used is constructed as a differential capacitor having a movable electrode serving as a weight. Although the method according to the Japanese Patent Application No. H5-322353 employs a capacitor and includes a servo system provided for the purpose of detection, it suffers from a high noise level because high frequency signals such as a carrier wave are used. This has resulted in a problem that the above-described configurations can not provide sufficient signal strength when it is employed in sensors such as for ABS and yaw rate sensors which must be able to detect low levels of acceleration. There has been another problem in that the circuit for generating the carrier wave occupies about 40 to 50% of the entire integrated circuit making it difficult to construct a more compact sensor chip. In the method according to Japanese Patent Application No. H5-322348, although acceleration is detected from changes in the amount of current flowing through the MISFET, it is not possible to separately detect acceleration in only one dimension because acceleration is detected on a two-dimensional basis at the same time in directions vertical and horizontal with respect to the substrate.

SUMMARY OF THE INVENTION

It is therefore an object of the present invention to provide a G sensor which does not utilize a carrier wave and has less noises and which is compact, reliable in operation, and capable of detecting acceleration in only one dimension.

According to the present invention, there is provided an acceleration sensor having a movable portion having movable gate electrodes which are supported by beams at a predetermined interval from the surface of a substrate and which can be displaced by acceleration and source and drain electrodes located relative to the movable gate electrodes so as to form an MIS-like structure for detecting acceleration acting on the movable gate electrodes. The movable gate electrodes are arranged on both sides of the movable portion in a face-to-face relationship to form at least one pair of MIS-type transistors having the same characteristics. The sensor is provided with a differential output portion for obtaining a differential output signal from mutually opposite dynamic characteristics exhibited by the pair of MIS-type transistors in response to the movement of the movable portion caused by acceleration. The sensor further is provided with an integration portion for integrating the differential signal. Further, the sensor is provided with a displacement control portion for performing displacement control based on the result of the integration by the integration portion so that the displacement of the movable portion is canceled by an electrostatic force having a sufficient magnitude to resist the acceleration.

Preferably, the displacement control portion comprises a movable electrode at the movable portion and a first fixed electrode and a second fixed electrode on the substrate and the pair of the first fixed electrode and the second fixed electrode is arranged so as to sandwich the movable electrode with substantially equal gaps therebetween.

Preferably, the displacement control portion feeds back an output signal to the movable portion. A predetermined bias is applied between the first and second fixed electrodes and the output signal is fed back to the movable electrode to generate an electrostatic force at the movable electrodes in the direction opposite to the acceleration which has caused displacement of the movable portion, thereby canceling the displacement.

Preferably, the output signal is fed back to the first fixed electrode and an inverted signal obtained by inverting the polarity of the output signal is fed back to the second fixed electrode. The movable electrode is kept at a predetermined electric potential to generate an electrostatic force at the movable electrode in the direction opposite to the acceleration which has caused displacement of the movable portion.

Preferably, a plurality of parallel double-end type beams support the movable portion and the pair of movable gate electrodes is disposed in the direction of the gate which is horizontal with respect to the substrate surface and perpendicular to the direction of the beams. The direction of the gate is the direction in which acceleration is detected.

Preferably, a mass portion is provided on one side of one of the double-end type beams as viewed in a direction perpendicular to the mounting direction thereof to form the movable portion for detecting acceleration in a direction perpendicular to the substrate surface. The movable electrodes are disposed on both sides of the direction perpendicular to the beam symmetrically about the beam. The displacement control portion is constituted by the movable electrodes symmetric about the beam and substantially equal in surface area. The first and second fixed electrodes on the substrate surface which face the movable electrodes and which are formed to be symmetric about the position of the beam and substantially equal in surface area.

Preferably, the differential output portion comprises a differential amplifier, which receives the outputs of the pair of MIS-type transistors, amplifies the difference between the outputs and outputs the result of the amplification as an input to the integrator.

Preferably, the displacement control portion includes a plurality of sets of the movable electrodes and the first and second fixed electrodes provided at the movable portion.

Preferably, the movable portion and the first and second fixed electrodes are provided at peripheral portions of the rectangular holes.

Preferably, the differential output portion is replaced by a comparator for performing conversion into a binary signal, and the integrator is replaced by a signal processing portion for performing predetermined signal processing. The signal processing portion converts the binary signal into a pulse-width-modulated pulse train and controls the displacement of the movable portion using this pulse train.

Preferably, the signal processing portion comprises an adder/subtracter circuit for performing addition and subtraction based on the binary signal and a D-A converter for performing D-A conversion on the data output by the adder/subtracter circuit.

In the present Invention, the movable gates of the movable portion themselves are displaced by the acceleration to be detected which acts on the substrate in one direction. As a result, the circuit becomes electrically unbalanced, and a differential voltage is generated at the pair of MIS transistors to be output as a detection signal. This output signal is returned to the displacement control portion which forms a part of the movable portion and controls the displacement. Then, a force which cancels the acceleration acting on the movable portion is generated at the displacement control portion to balance the movable portion at its neutral position, thereby stabilizing the detection signal on a closed loop control basis. Further, since the signal detection is performed on a differential basis, even if the movable portion is displaced by acceleration in any direction other than the horizontal direction, especially by acceleration in a direction vertical to the substrate, there is no influence on the signal because such displacement will provide common mode signal components.

Further, since the first and second fixed electrodes provide the movable electrode serving as a weight with substantially equal electromagnetic forces, the movable electrode is maintained at its neutral position. The servo control is performed by use of feedback. This feedback is provided by applying a predetermined bias to the pair of fixed electrodes to cause the electric potential of the movable electrode to fluctuate in accordance with acceleration. Thus, the acceleration is canceled and the neutral position is maintained.

Other features of the present invention will become apparent from the following descriptions when taken in conjunction with the accompanying drawings.

DETAILED DESCRIPTION OF THE PREFERRED EMBODIMENTS

The present invention will now be described with reference to specific embodiments thereof.

Figure 1:
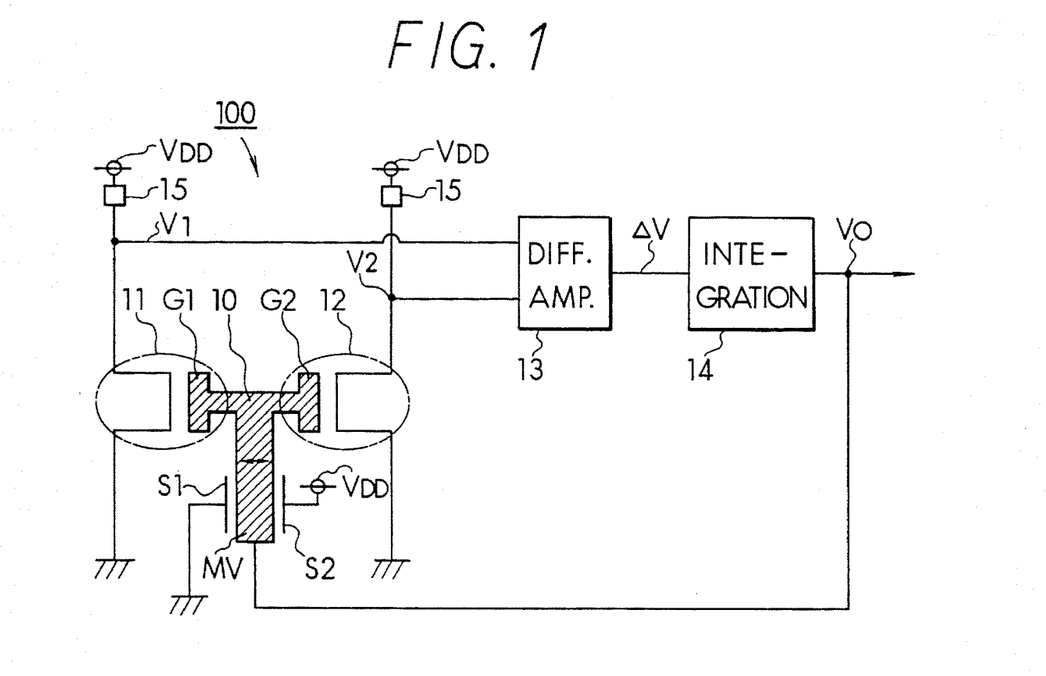
FIG. 1 shows a basic circuit configuration of a semiconductor acceleration sensor (G sensor) according to a first embodiment of the present invention.

A first embodiment of the present invention will now be described with reference to FIG. 1 showing an example of a basic circuit configuration of a semiconductor acceleration sensor (G sensor). The sensor 100 comprises movable gates G1 and G2 and a movable electrode MV which collectively constitute a movable portion (MG) 10 for detecting acceleration, a pair of MIS-type transistors 11 and 12 as a signal processing portion, a differential amplifier portion 13 which receives the outputs from the drains of the transistors 11 and 12 as the difference between voltages V1 and V2 at loads 15 to obtain a differential output signal ΔV, and an integration portion 14 for integrating the differential output signal to output an output signal Vo.

Figure 2A:
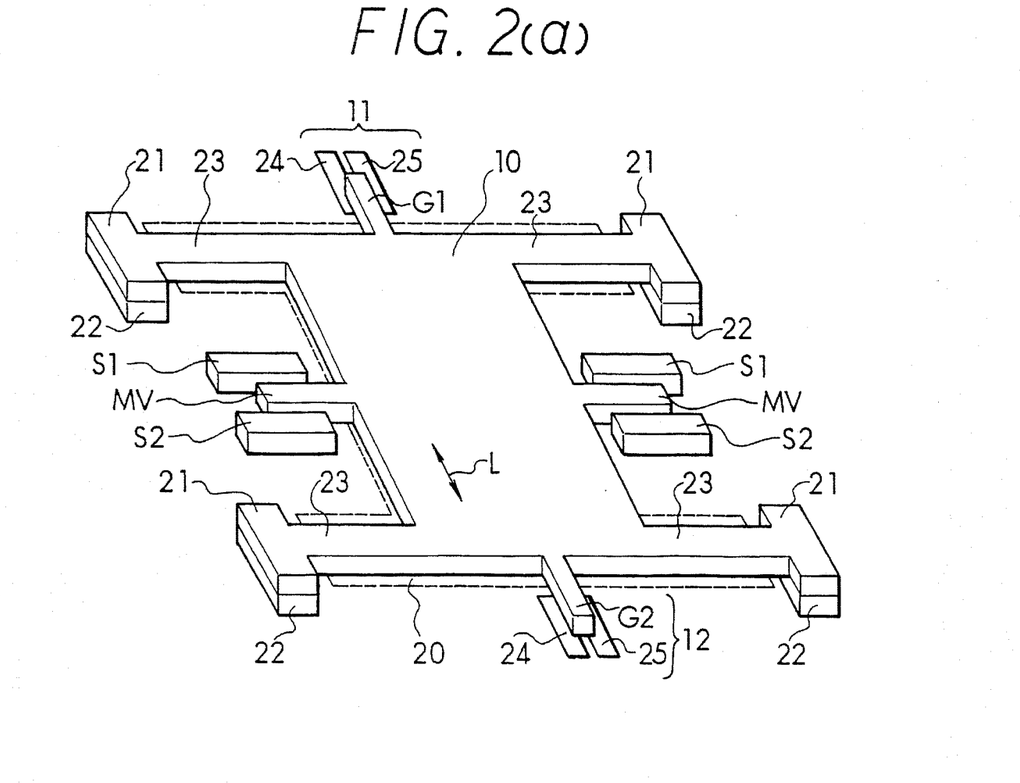
FIG. 2(a) shows a representative shape of a movable portion serving as an acceleration detecting portion.

FIG. 2(a) shows an example of the implementation of the movable portion 10, wherein the movable portion 10 is shown to be supported by a pair of double-end type beam portions 23. It should be noted that FIG. 2(a) shows only those parts formed on a substrate (not shown) which are associated with the movable portion 10.

The movable gates G1 and G2 are electrically configured to have the same electric potential and respectively serve as gate electrodes of the MISFET (MIS-type transistors, movable gate transistors) 11 and 12 having the same shape.

Figure 2B:
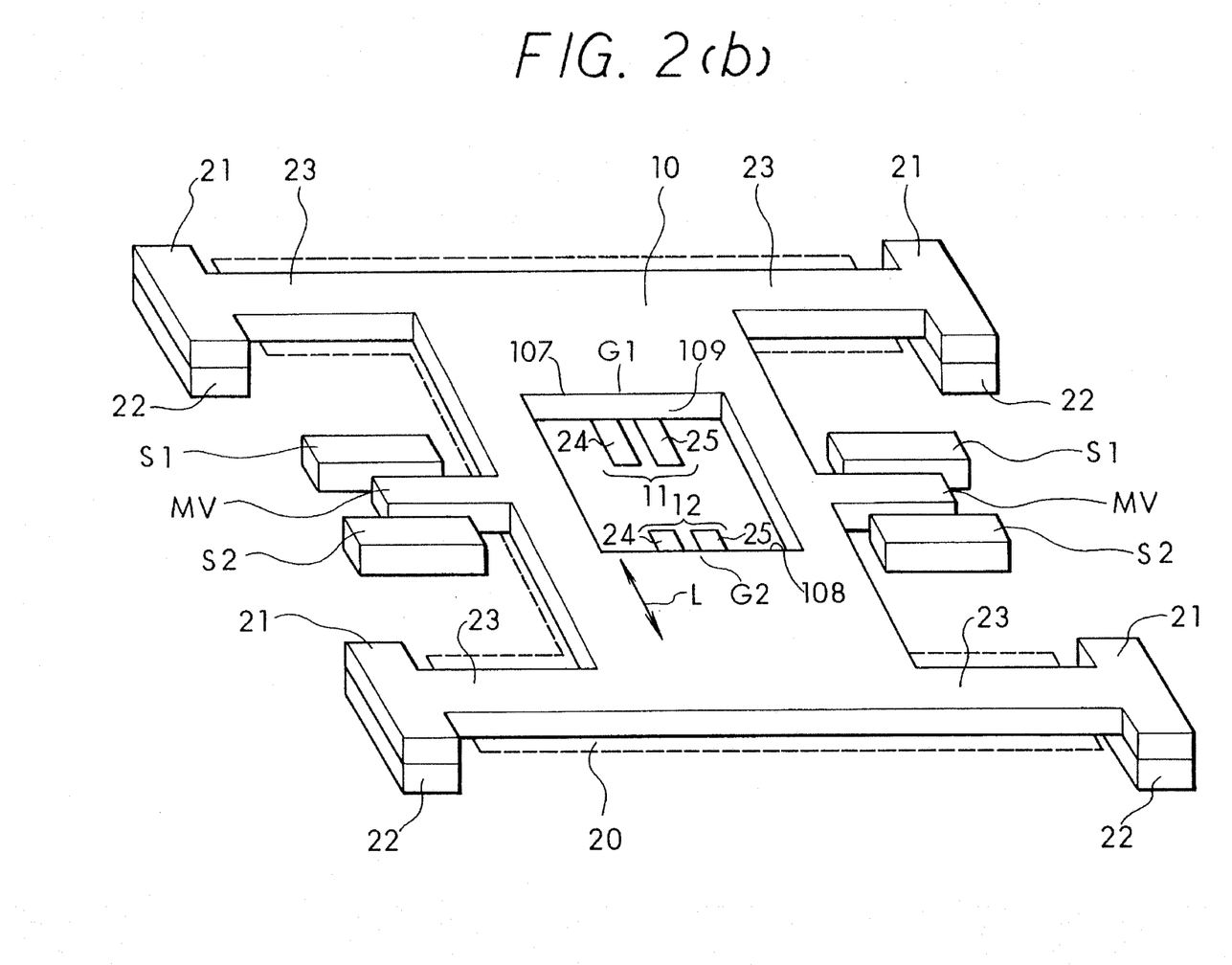
FIG. 2(b) shows a modified shape of a movable portion shown in FIG. 2(a)

The MISFET 11 and 12 need not be formed as shown in FIG. 2(a) but may be formed as shown in FIG. 2(b). That is, a square-shaped opening 107 is formed in the movable portion 10 to provide faces 108 and 109 which face each other in the acceleration detection direction L. The source and drain electrodes 24 and 25 are arranged on the substrate under the opposing surfaces 108 and 109. The movable gates are shown by G1 and G2 in the figure. Thus, two pairs of source and drain electrodes 24 and 25 are arranged closely to each other so that the acceleration in the direction parallel to the surface of the substrate may be detected differentially. As a result, the difference in the characteristics of the transistors can be reduced and limitation in the acceleration detecting operation can be minimized.

The movable electrodes MV serving as a weight are also configured to have the same electric potential. These movable gates G1 and G2 and movable electrodes MV are integrally constructed to form the movable portion 10 for detecting acceleration in the direction which is parallel to the substrate and in which the movable gates G1 and G2 are aligned in the direction L indicated by the arrow in FIGS. 2(a) and 2(b). The movable portion 10 is supported above the substrate using fixing portions 21 on insulation portions 22 provided on the substrate at one end of each beam portion 23. As shown in FIGS. 2(a) and 2(b), the movable gates G1 and G2 and movable electrodes MV are arranged to be dynamically symmetric and identical in shape with respect to the direction L of the movable portion 10. In order to provide the movable gates G1 and G2 and movable electrodes MV with an electric potential from the substrate, the fixing portions 21 and insulation portions 22 have portions to allow them to contact with the substrate.

The source and drain electrodes of the MISFETs 11 and 12 are formed in semiconductor active regions 24 and 25 in the substrate. The source and drain electrodes are formed in an arrangement like an MIS structure, more specifically, in a self-matching arrangement, wherein the channel regions thereof partially overlap with the respective movable gates G1 and G2 at the underside thereof and wherein the overlapping area changes as the movable gates G1 and G2 are moved. The source electrodes 24 and drain electrodes 25 of the MISFETs 11 and 12 have the same size and are formed so that electric current of the same value will flow if the movable gates G1 and G2 overlap in the same amount. As a result, a predetermined constant voltage is applied to the power supplies VDD of the MISFETs 11 and 12.

In order to prevent an electrostatic force from being caused between the movable portion 10 and the substrate, an active region 20 is provided in the area of the substrate under the movable portion 10 by adding impurities at a high concentration so that it will have the same electric potential as that of the movable portion 10.

The outputs of the two MISFETs 11 and 12 are connected to the loads 15 connected to the respective power supplies VDD to be taken out as voltages $V_1$ and $V_2$ which are input to the differential amplifier portion 13 for amplifying the difference $\Delta V = V_1 - V_2$ between the two outputs. Since the difference $\Delta V$ is in a small signal value, an amplification factor of 1 or more is normally employed. The amplified output $\Delta V$ is input to the integration portion 14, and the result of the integration is output as an output signal $V_0$. The output signal $V_0$ is fed back to the movable electrodes MV through the fixing portions 21 of the movable portion 10. Such an electrical circuit is formed on the semiconductor substrate simultaneously with the movable portion 10 using a conventional semiconductor process which is well known.

The outline of the movable portion 10 shown in FIG. 2 does not reflect the actual dimensions and may be designed as required based on the level of the acceleration to be detected and the type and strength of the material of the movable portion. For example, not only semiconductor materials but also metals having high melting points such as tungsten may be used for the movable portion 10. Further, since the magnitude of the differential voltage produced by the movement of the movable gates depends on factors including the dimensions of the sources and drains, such dimensions may be selected to obtain a signal level suitable for the intended the purpose.

When no acceleration is acting on the semiconductor G sensor device having the movable portion constructed as described above, a bias voltage of a value VDD/2 which is one half of the power supply VDD is supplied to the movable portion 10 as a driving point for the MISFETs 11 and 12, equalizing the voltages $V_1$ and $V_2$ as the outputs of the MISFETs. Therefore, the difference $\Delta V$ equals 0 and there is no change in the output signal $V_0$ when no external force exists, i.e., there is no acceleration. Since the output signal $V_0$ is fed back to the movable portion 10, the bias value VDD/2 of the movable portion 10 is then at a zero point.

Assuming that an acceleration of a certain magnitude takes place toward the gate G1 (the rise or change of the acceleration in magnitude is ignored), the movable portion 10 receives a force toward the gate G1 and moves to a point at which the elastic force of the beams 23 resists it. This results in a movement of the movable gate G1 which increases the current through the MISFET 11, thereby decreasing the voltage $V_1$. Since the gate G2 on the side of the MISFET 12 makes the reverse movement, the voltage $V_2$ is increased conversely. As a result, the differential voltage $\Delta V$ attains a value of $-\Delta V_1$ and the value of output voltage changes from the value $V_0$ to a decreased value $v_0 - v_1$ accordingly. Since this voltage is fed back to the movable electrodes MV, the bias applied to the movable portion 10 and the movable electrodes MV which have been displaced toward the gate G1 through first fixed electrodes S1 and second fixed electrodes S2 produces a great electrostatic force toward the second electrodes S2 in the direction opposite to the movement of the movable portion 10 to move the movable electrode MV and the movable portion 10 toward the gate G2 to place them in their initial neutral positions. Since this series of reactions is electrical, it provides an output signal while performing control by generating the electrostatic force substantially simultaneously with the mechanical movement, i.e., following the occurrence of acceleration. As a result, the movable portion 10 returns to the substantially neutral position after a little movement. Accordingly, the gates G1 and G2 return to their initial neutral positions. Thus, $\Delta V$ equals 0, and the increase of the output integrated value is stopped to leave the value $v_0 - v_1$ unchanged. If the change which has occurred is such that the acceleration continues to increase, they will always continue to stay in positions slightly displaced from the neutral positions and the output voltage will continue to change.

When the acceleration is stopped, since the electrostatic force generated still remains, it displaces the movable portion 10 toward the gate G2, thereby decreasing the voltage $V_2$ and increasing the voltage $V_1$. Then, the difference $\Delta V$ takes a value of $+\Delta v_1$. As a result, the output voltage starts to rise from the potential of $v_0$-$v_1$, the electrostatic force is reduced to return the movable portion 10 to the neutral position again and the increase of the output voltage is stopped after an increase of $+\Delta v_1$. In other words, the output voltage $V_0$ is decreased while acceleration is acting toward the gate G1 and returns to the initial value of $v_0$ when the acceleration is stopped. Therefore, while there is acceleration, the output signal $V_0$ exhibits changes proportionate to the acceleration, and it returns to the zero point (VDD/2) when the acceleration becomes zero. The output signal thus becomes a signal indicating the acceleration. When acceleration occurs in the reverse direction toward the gate G2, the operation takes place in the reverse way to increase the output voltage $V_0$ and, when the acceleration stops, the voltage returns to the initial value $v_0$.

Since the pair of MIS-type transistors for obtaining the differential output are formed in substantially the same location on the semiconductor substrate, it can be assumed that the temperatures of those transistors which affects on the carrier density have the same value. Thus, the influence of temperature on the signal can be ignored. In some environments such as vehicles, fluctuations of the power supply can occur, resulting in fluctuations in the power supplies of the acceleration sensor itself (VDD in FIG. 1). Since the detection method employed is on a differential basis, such fluctuations in the power supply (common mode noise components) will have substantially no influence on the signal. Although it is unavoidable that the electrical circuit has errors at the amplifier portion, zero point drifts at the integration portion, and the like, such problems can be solved using common electronic circuit techniques such as trimming correction, the provision of a correction circuit, and periodic zero point correction. Theoretically, these problems are not directly related to the present invention and will not reduce the effectiveness of the present invention.

A second embodiment of the present invention will now be described. The means for generating an electrostatic force at the movable portion 10 to cancel the acceleration of the movable portion 10 is not limited to the configuration shown in FIG. 1 and may have any other configuration and FIG. 3 may be employed as a configuration to apply an electrostatic force to the movable portion 10 to obtain the same effect.

Figure 3:
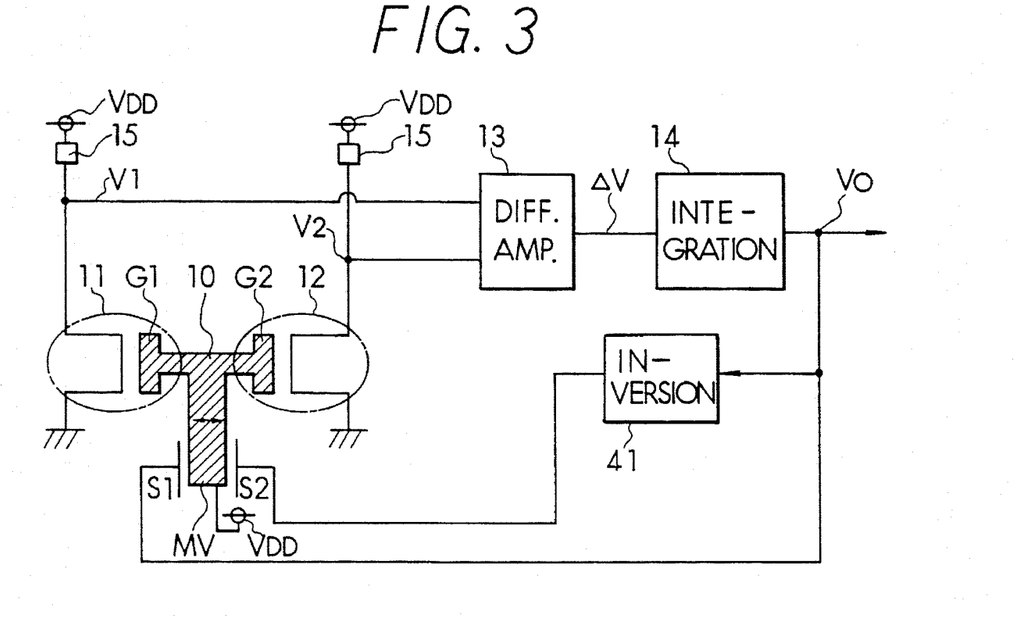
FIG. 3 shows a circuit configuration of a second embodiment of the present invention.

In FIG. 3, the output voltage is fed back to the fixed electrode S1 for the movable electrode MV serving as a weight of the movable portion 10. A voltage obtained by inverting the output voltage is supplied to the fixed electrode S2 and the movable electrode MV is kept at a predetermined electric potential VDD. An electrostatic force is generated at the movable electrode MV. In this configuration, since there is no possibility of a change in the electric potential of the gates due to acceleration, a constant drain current is always obtained. This results in an advantage in that the speed of the feedback in the servo control and the like will be independent of acceleration.

Figure 4A:
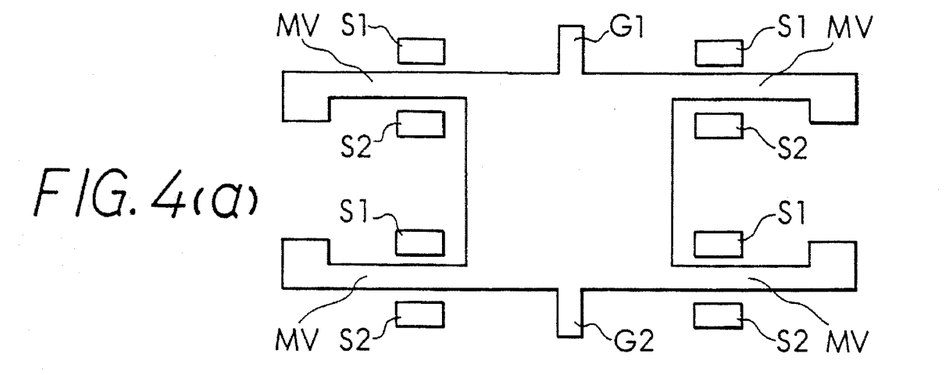
FIG. 4(a) shows a representative configuration of a movable portion according to a third embodiment of the present invention.
Figure 4B:
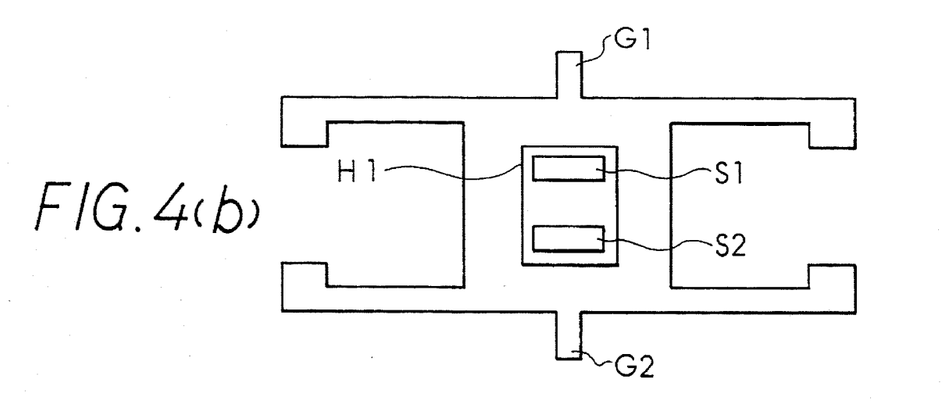
FIG. 4(b) shows a representative configuration of a movable portion according to the third embodiment of the present invention.
Figure 4C:
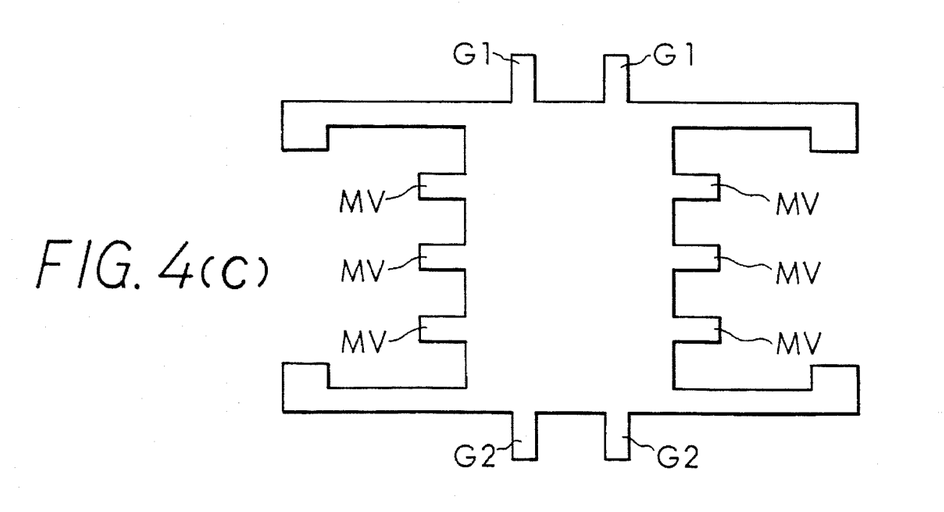
FIG. 4(c) shows a representative configuration of a movable portion according to the third embodiment of the present invention.

A third embodiment of the present invention will now be described. The arrangement of the movable gates and the movable electrodes MV shown in FIG. 2 is not limited but four pairs of movable gates and six pairs of movable electrodes MV may be arranged instead as required in relation to the response and braking of the movable portion to acceleration and the like. The representative configurations shown in FIGS. 4(a) through 4(c) illustrate several variations of the movable portion. FIG. 4(a) shows a configuration, wherein the movable electrodes MV are used as beam portions and the first and second fixed electrodes S1 and S2 are formed so that they sandwich the beams. Since there are four beam portions, those electrodes are formed at all of the four locations considering dynamic balance. FIG. 4(b) shows a configuration to implement the configuration in which a rectangular hole H1 is formed at the center of the movable portion. The first and second fixed electrodes are formed at the peripheral portions of the rectangular hole. FIG. 4(c) shows a configuration in which a multiplicity of movable gates G1 and G2 and movable electrodes MV serving as a weight are formed. This configuration improves the strength of a signal. In any of those cases, the configuration is dynamically symmetric with respect to the direction in which acceleration occurs.

Needless to say, any other dynamic configurations of the movable portion will provide advantageous characteristic of the present invention as long as it allows detection of acceleration in only one direction.

Figures 5A, 5B:
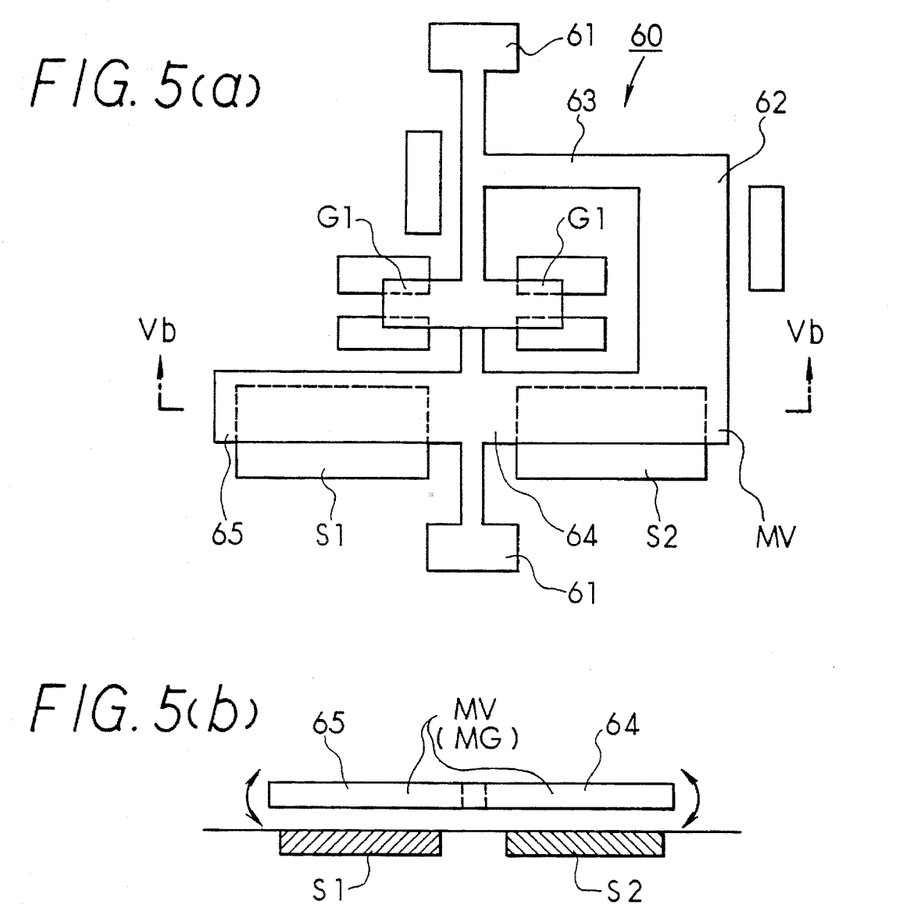
FIG. 5(a) shows a configuration of a movable portion according to a fourth embodiment of the present invention.
FIG. 5(b) shows a configuration of a movable portion according to the fourth embodiment of the present invention.

A fourth embodiment of the present invention will now be described. FIG. 5(a) shows a structure, wherein a mass portion 62 of a movable portion 60 is supported by a single-end beam portion 63. In this structure, the movable gates G1 and G2 rotate about a double-end beam portion 61 in response to acceleration in a direction perpendicular to the substrate. The movable gates thereby cause the gap between source and drain portions of the substrate to change, which results in a change in the carrier density and hence a change in the current. The movable portion 60 has a movable electrode MV formed on both sides of the double-end beam portion 63 serving as an axis of rotation to be symmetric about the axis of rotation. The first fixed electrode S1 and the second fixed electrode S2 are provided on the substrate side under the portions 65 and 64. FIG. 5(b) is a sectional view of the movable portion 60 taken laterally along the line Vb—Vb in FIG. 5(a). The movable electrode MV receives an electrostatic force from fixed electrodes S1 and S2 provided on the substrate. As a result, it has a rotational force in the opposite direction which balances the above-described rotation. The configuration shown in FIG. 5(a) and FIG. 5(b) is not limited but other configurations such as the shapes and dimensions of the first and second fixed electrodes S1 and S2 may be optimized depending on the materials used and the conditions under which the device is used. The thickness of the beams is also determined based on the level of the acceleration to be detected.

Figure 6:
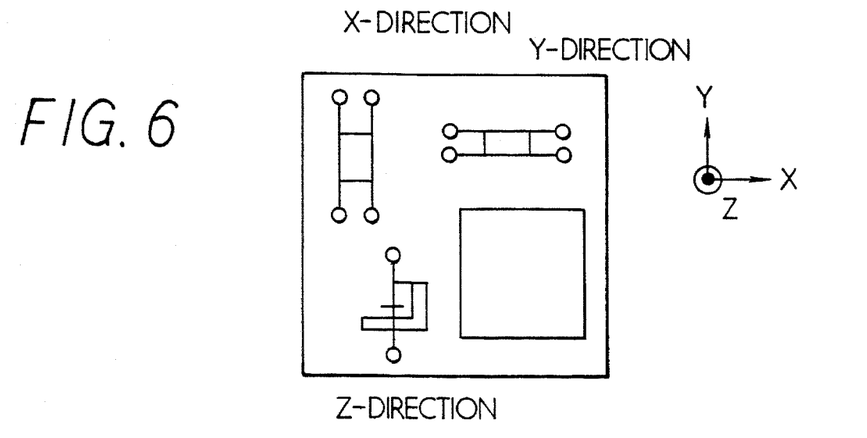
FIG. 6 shows a representative configuration of a fifth embodiment of the present invention.

A fifth embodiment of the present invention will now be described. The first embodiment for detecting acceleration in a direction horizontal to the substrate and the third embodiment for detecting acceleration in a direction vertical to the substrate may be combined in a single chip which allows formation of a semiconductor G sensor capable of detecting acceleration in three dimensions independently of each other. Specifically, as shown in FIG. 6, horizontal detection type G sensors are arranged at right angles to each other along orthogonal x, and y axes and a vertical detection type G sensor is arranged along Z axis. The horizontal detection type acceleration sensor and the vertical detection type acceleration sensor are formed on the single chip at the same time. Since an arithmetic portion or a signal processing portion therefor can be simultaneously formed in a peripheral position on the chip, it is possible to provide a compact single-chip type G sensor for detecting three-dimensional acceleration. This sensor can detect the component of acceleration in each direction independently of each other and cancel noises other than the components of acceleration in each direction to obtain more accurate acceleration signals. Although not shown, it is to be noted that bidirectional detection can be performed by combining two G sensors. For example, acceleration in the direction of the x-y plane can be detected using two units of the horizontal detection type G sensor according to the first embodiment while detection in x- and z-directions (the two directions of a plane vertical to the substrate) can be performed by combining horizontal detection type and vertical detection type sensors.

A sixth embodiment of the present invention will now be described. According to the first through fifth embodiments, the difference between the drain voltages $V_1$ and $V_2$ of the MISFETs 11 and 12 is amplified by the differential amplifier portion 13 and integrated by the integration portion 14. In the sixth embodiment of the present invention shown in FIG. 7, the voltages $V_1$ and $V_2$ are compared by a comparator 71 to be converted into a binary signal at a high or low level. The binary signal is then subjected to predetermined signal processing at a signal processing portion 72. Thereafter, the output signal is fed back to the movable portion 10 or the first and second fixed electrodes (S1 and S2 in FIG. 3) to allow servo control. The configuration according to this sixth embodiment is the same as those in the first through fifth embodiments except that the differential amplifier portion and the integration portion are replaced by the comparator 71 and the signal processing portion 72, respectively.

Figure 7:
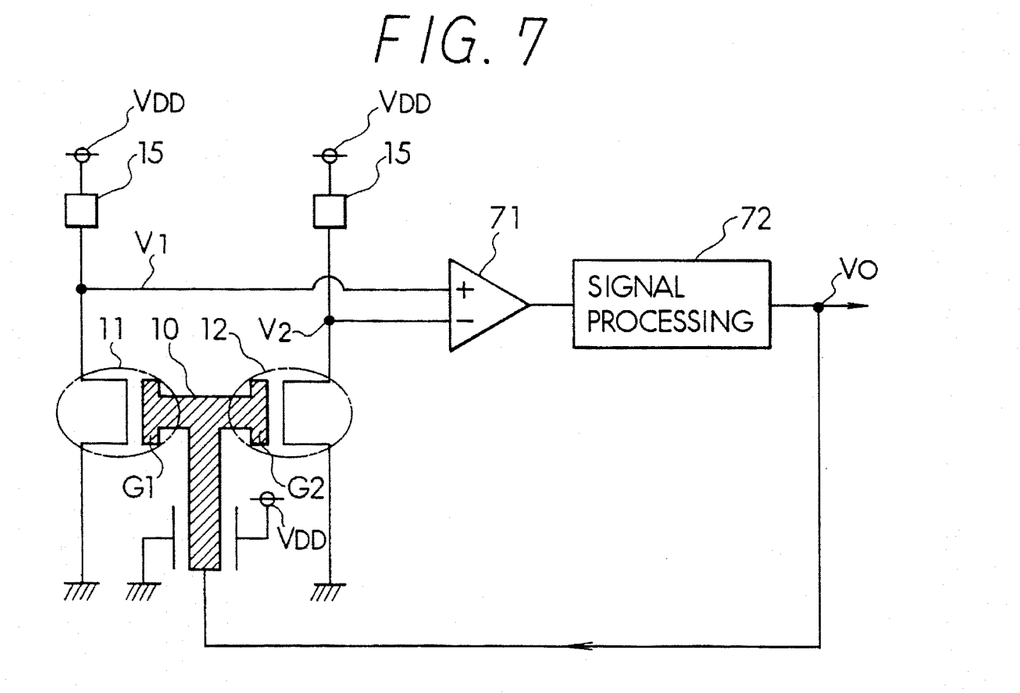
FIG. 7 shows a representative configuration of a sixth embodiment of the present invention.
Figure 8A:
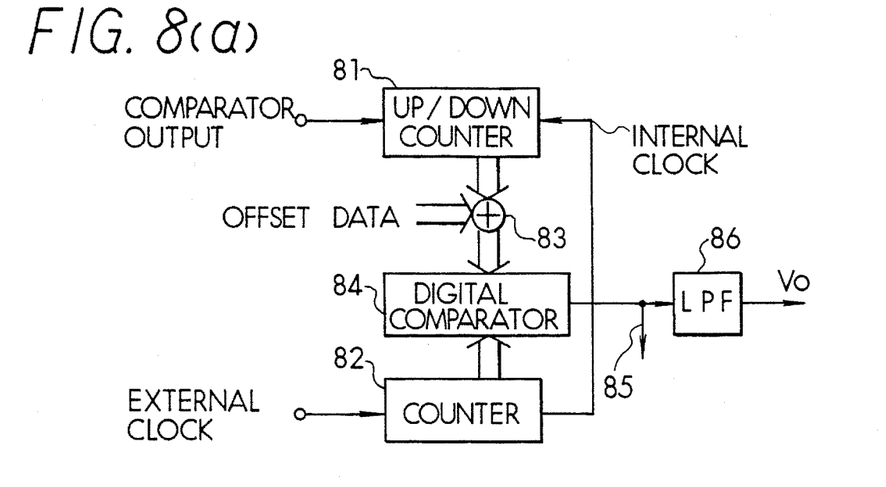
FIG. 8(a) is a block diagram showing an example of the configuration of a signal processing portion according to the sixth embodiment.
Figure 8B:
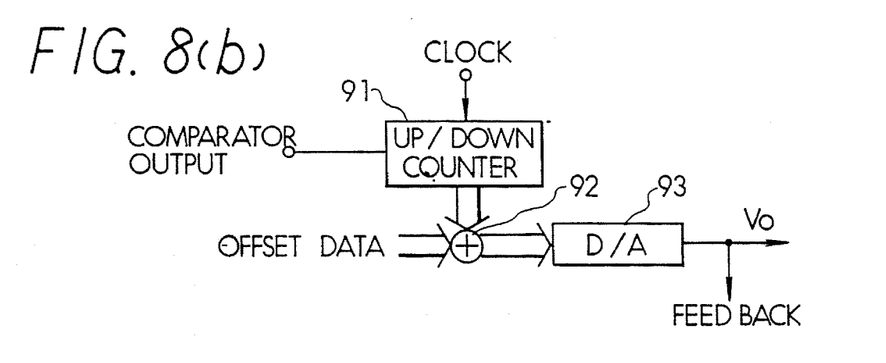
FIG. 8(b) is a block diagram showing another example of the configuration of the signal processing portion according to the sixth embodiment.

Examples of the configuration of the signal processing portion 72 in FIG. 7 are shown in FIG. 8(a) and FIG. 8(b). In the configuration shown in FIG. 8(a), the output of the comparator 71 is converted into a pulse train which is pulse-width-modulated by a modulation circuit. This signal is then fed back to the movable portion 10 to control the displacement thereof. High frequency components of this pulse train are removed by a low-pass filter (LPF) to obtain an output signal $V_0$ in accordance with the acceleration.

The modulation circuit in FIG. 8(a) is comprised of a dividing counter 82 which performs frequency-division by counting external clock signals to generate internal clock signals, an up-down counter 81 which operates in accordance with the output signal of the comparator on each internal clock, and a digital comparator 84 which compares a value obtained by adding the output of the up-down counter 81 and offset data at an adder/subtracter 83 with the dividing counter 82. The internal clock provides the same effect as determining the sampling period that constitutes one period of the pulse-width-modulated (PWM) signal of interest. Since this PWM signal is the output, the PWM signal is directly fed back. Analog output $V_0$ is obtained through a low pass filter (LPF) 86 which removes noises from the output.

The operation of the configuration shown in FIG. 8(a) will now be briefly described with reference to an exemplary time chart shown in FIG. 9. The dividing counter 82 counts the external clock and an overflow occurs causing the count value to return to 0. This process is repeated and signals indicating such overflows serve as the internal clock. In this case, a three-bit counter is used to form an internal clock pulse in response to eight pulses of the external clock. Whether the up-down counter 81 is to count up or down is determined by the state of the comparator output, i.e., high or low, at the timing at which each internal clock is input to the up-down counter 81. The resulting up-down counter data varies accordingly.

Figure 9:
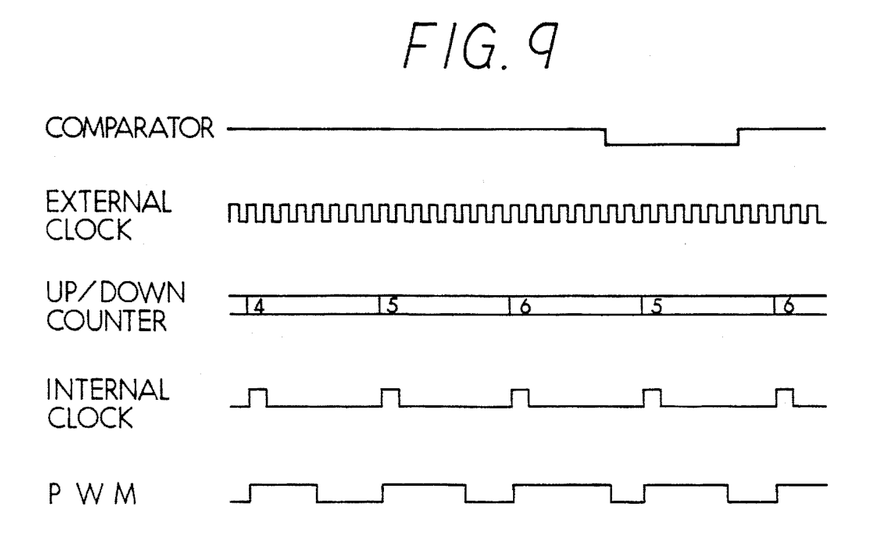
FIG. 9 is a timing chart of the signal processing portion shown in FIG. 8(a)

In the time chart shown in FIG. 9, the up-down counter data initially indicates "4" which is followed by "5", "6", "5" and "6" depending on the state of the comparator. This up-down counter data is compared with the data of the dividing counter 82 by the digital comparator 84. Since the output of the digital comparator 84 is high when the value of the dividing counter 82 becomes zero and is low when the data match with each other, the output becomes a PWM signal which is a pulse whose cycle coincides with the internal clocks and whose pulse width is determined by the up-down counter data, i.e., the value of the comparator output. Here, the offset data is assumed to be zero and has not been described. This data is used to correct the up-down counter data with an appropriate value in the case that output is generated to effect undesired control even when there is no acceleration.

When the PWM signal is fed back to the movable portion 10 as shown in FIG. 7, an electrostatic force responding to the PWM signal in the form of a pulse is applied to the movable gates G1 and G2 of the movable portion. However, since the resonance frequency of the movable portion 10 is as low as several hundred Hz to several KHz, the electrostatic force applied to the movable gates G1 and G2 can be regarded as proportionate to the duty of the pulse because the frequency of the signal is sufficiently high. This results in the same effect as that obtained by control using negative feedback on an analog basis. This pulse output is output as the output signal $V_0$ through the low-pass filter (LPF) 86. Since the low-pass filter (LPF) 86 converts the signal so that analog output is obtained, the output signal $V_0$ may be fed back.

Specifically, when acceleration acts on the movable gates G1 and G2 and the comparator 71 outputs the high or low level, the up-down counter 81 continuously counts up or down, causing the pulse width of the PWM signal output to increase and decrease. This is equivalent to the operation of the integrator in the analog circuit. As a result, the electrostatic force is increased and decreased to return the movable portion 10 to the central portion. When the movable portion 10 moves beyond the center, the output of the comparator 71 is inverted and the up-down counter 81 starts to count in the reverse way. As a result, the movable portion 10 is pulled back toward the center again. Finally, the comparator 71 repeatedly outputs the high and low levels and the data of the up-down counter 81 converges at a certain value in accordance with the acceleration. The digital comparator 84 outputs a pulse having a duty in accordance with the acceleration. A voltage proportionate to this duty, i.e., a voltage proportionate to the acceleration can be obtained by passing this pulse signal through the low-pass filter (LPF) 86.

The displacement of the movable portion 10 can be controlled according to various modulation methods including pulse density modulation other than pulse width modulation. When a digital signal 85 as shown in FIG. 8(a) is fed back to the first and second fixed electrodes as shown in FIG. 3, a signal obtained by inverting the signal using an invertor (NOT circuit) may be used simultaneously. The digital signal may be directly fed back to the first fixed electrode S1 and the inverted signal may be fed back to the second fixed electrode S2.

In the configuration shown in FIG. 8(b), addition and subtraction are performed on the output of the comparator 71 in synchronization with a clock corresponding to the internal clock in FIG. 8(a), and digital values obtained by the addition and subtraction are D-A converted to perform an operation equivalent to that of the integrator. The output of the comparator 71 is input to an up-down counter 91 which counts up or down in accordance with the output of the comparator 71 in synchronization with the clock signal. Offset data is added to and subtracted from the output data of the up-down counter 91 by an adder/subtracter 92, and the resulting output is D-A converted by a D-A converter 93. This converted signal is fed back to the movable portion 10 to control the displacement of the movable portion 10 and is output as the output signal $V_O$.

This configuration performs an operation wherein, when acceleration acts on the movable portion 10 causing the comparator 71 to output the high or low level, the up-down counter 91 continuously counts up or down to cause the pulse width of the PWM signal output to increase and decrease. As a result, the electrostatic force is increased and decreased to return the movable portion 10 to the central portion. When the movable portion 10 moves beyond the center, the output of the comparator 71 is inverted and the up-down counter 91 starts to count in the reverse way. Then, the movable portion 10 is pulled back toward the center again. Finally, the comparator 71 repeatedly outputs the high and low levels, and the data of the up-down counter 91 converges at a certain value in accordance with the acceleration. This causes the D-A converter 93 to output a voltage in accordance with the acceleration. That is, this D-A converter performs the same function as the digital converter in FIG. 8(*a*). The offset data is used in the same way as described with reference to FIG. 8(*a*).

When feedback to the fixed electrodes S1 and S2 is performed in the configuration shown in FIG. 8(*b*), two pairs of the adder/subtracter 92 and D-A converter 93 may be prepared to obtain mutually inverted signals by performing addition on the data output of the up-down counter 91 using one of the pairs and by performing subtraction using another pair. Alternatively, the analog output may be fed back using the inversion portion 41 shown in FIG. 3.

As described above, there are various methods for configuring the circuit of the signal processing portion 72, and any circuit configuration may be employed as long as it is capable of controlling the movable portion 10. While error factors such as zero-point drifts occurring at the amplifier portion and integration portion are corrected by offset adjustment and trimming in the first and second embodiments, the signal processing portion 72 may be configured on a digital basis to allow adjustment of such offset and sensitivity to be easily made using digital values. This reduces the work and cost associated with the complicated trimming process. In addition, direct outputting of digital values simplifies signal processing performed by a microcomputer or the like and allows the performance to be diversified.

Figure 10:
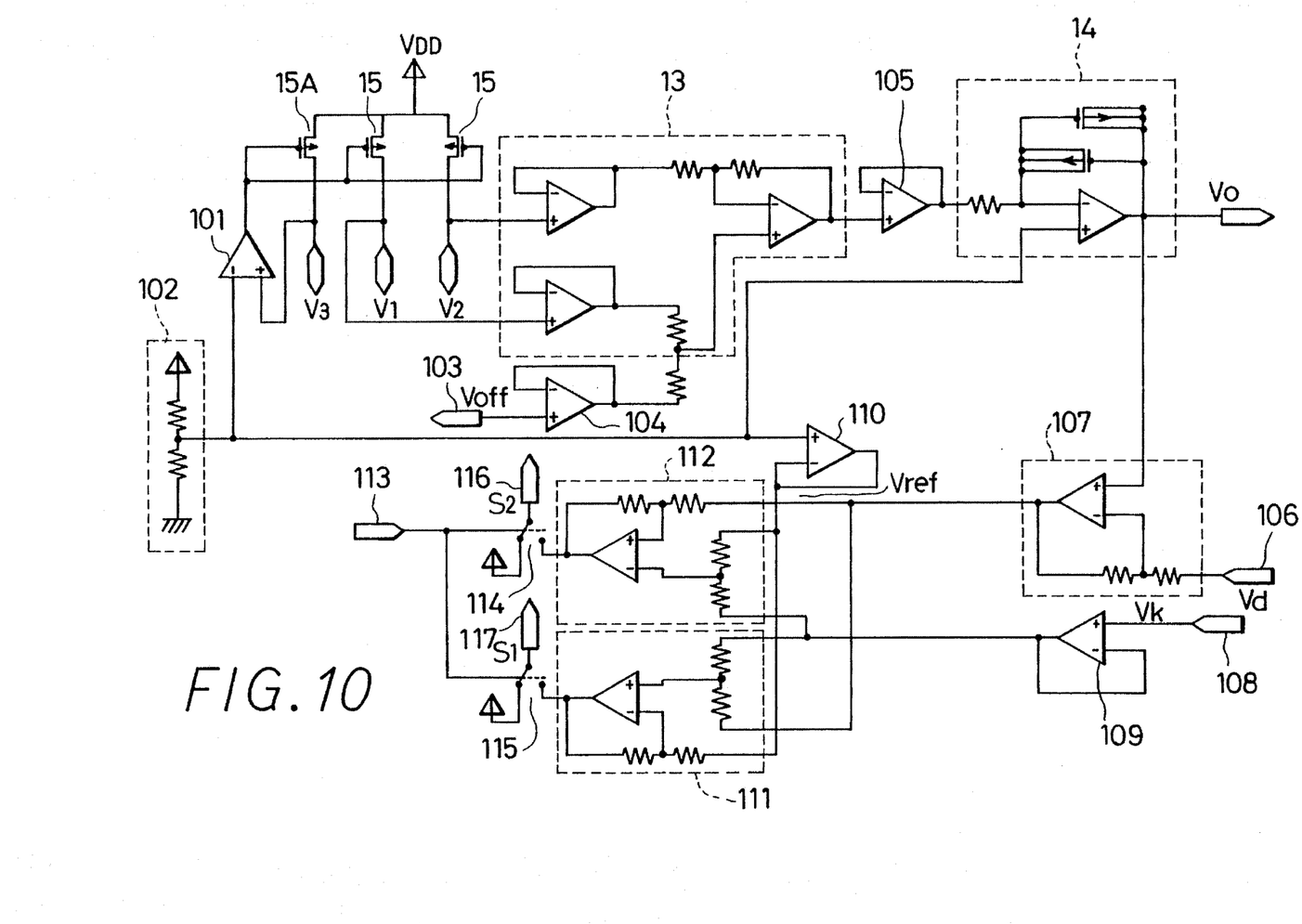
FIG. 10 shows a circuit configuration of a seventh embodiment of the present invention.

A seventh embodiment of the present invention will now be described. FIG. 10 shows a specific circuit configuration of this embodiment. This circuit operates on the same principles as those for the circuit shown in FIG. 3. The output voltage Vo and a voltage obtained by inverting the output voltage are applied to the fixed electrodes S1 and S2 with the voltage of the movable gates G1 and G2 fixed, to perform a servo operation using an electrostatic force thus obtained.

The voltage Vdd/2 serving as the reference voltage is generated at a circuit 102. Operational amplifiers 104, 105, 109, and 110 are connected for impedance conversion. A terminal 103 for adjusting offset voltage is provided at a differential amplifier portion 13. Since the output voltage of the differential amplifier portion 13 is (V1–V2)+Voff, the initial offset voltage (V1–V2) can be adjusted by Voff.

A terminal 106 for operation check is provided at the input of a differential amplifier 107 connected to an output terminal Vo. In normal operation, the terminal 106 is left open so that the output voltage of the differential amplifier 107 equals Vo and there will be no influence on the servo operation. However, when a voltage Vd is applied to the terminal 106, the output voltage of the differential amplifier 107 becomes 2Vo–Vd. As a result, the voltages of the fixed electrodes change, displacing the movable electrode by the electrostatic force. If the sensor and the circuit operate properly, the output Vo equals Vdd/2. This removes the electrostatic force and returns the movable electrode to the initial state. When there is any abnormality in the circuit or sensor, such abnormality can be detected because the output Vo does not equals Vdd/2.

Further, a terminal for sensitivity adjustment 108 is provided at the input of differential amplifiers 111 and 112 connected to the output of the differential amplifier 107. Since, as expressed by the following equation, the sensitivity of the sensor is proportionate to the voltage between the movable electrode and the fixed electrodes, the sensitivity can be adjusted by changing the reference voltage Vr of the fixed electrodes.

$ma = \epsilon_0 A/2 \ [(Vr-Vg/d1)^2 - \{(Vr+Vg)/d2]^2]$ wherein, m: mass of the mass portion a: acceleration $\epsilon_0$: dielectric constant of the air A: surface area of the electrodes d1: distance (1) between the movable electrode and the fixed electrodes d2: distance (2) between the movable electrode and the fixed electrodes.

If d1=d2=d, it holds that:

$ma = 2 \ \epsilon_0 AVr \cdot Vg/d^2$ and $Vg = mad^2/(2 \ \epsilon_0 AVr)$

Then, the differential amplifiers 111 and 112 add a sensitivity adjusting voltage Vk to adjust the sensitivity. The reference voltage Vref=Vdd/2 in the circuit shown in FIG. 11, and Vr and Vg in the above first equation are as follows.

Vr=Vdd–Vref=Vdd/2=Vref

Vg=Vo–Vref

The reference voltage Vref also serves as a reference for the sensitivity adjusting voltage Vk. Therefore, the voltage to be applied to the fixed electrodes is:

(reference voltage) + (sensitivity adjusting voltage) ±

(output voltage)

= Vreff + (Vk – Vref) ± (Vo – Vref)

= Vk ± (Vo – Vref).

So the outputs of the differential amplifiers 111 and 112 are (Vo–Vref)+Vk and (Vref–Vo)+Vk, respectively.

Switches 114 and 115 are provided for temporarily switching the voltage of the fixed electrodes to a value equal to that of the movable electrode in order to prevent the movable electrode from touching the fixed electrodes when the power is initially supplied.

The voltages applied to the sensitivity adjusting terminal and offset adjusting terminal may be provided by trimming a thin film resistor or may be provided on a digital basis using a memory and a D-A converter. There is no restriction in the method for applying the voltages.

Figure 11:
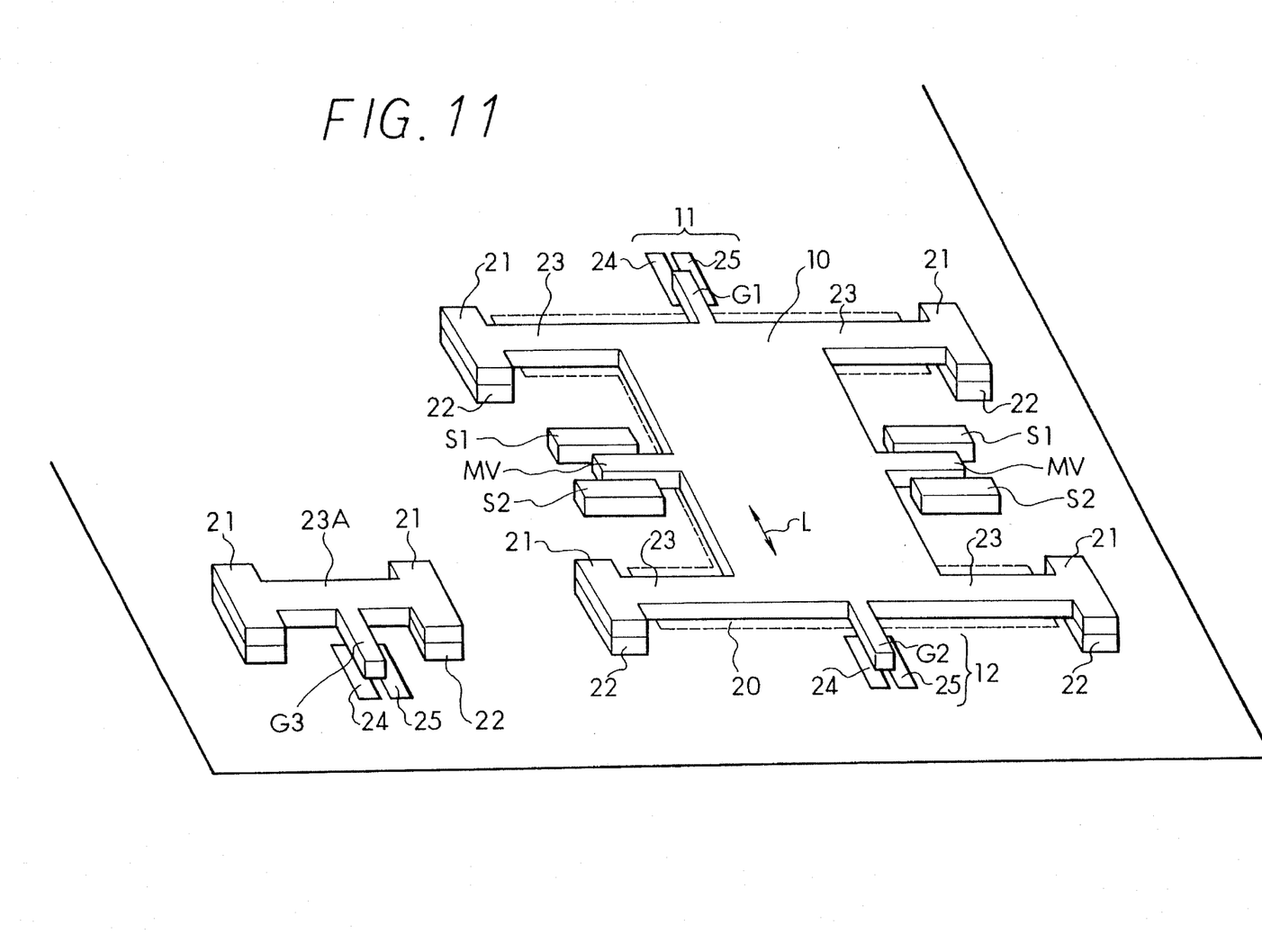
FIG. 11 is a representative circuit diagram of a movable portion according to the seventh embodiment of the present invention.

As shown in FIG. 11, MIS-type transistor G3 with a movable gate having the same configuration as the transistor 11 or 12 of FIG. 2 except that no mass portion is provided may be arranged in the vicinity of the sensor. The drain of this transistor may be connected to the terminal V3 so that the operating points of the voltages V1 and V2 are always kept constant regardless of temperature. Since the transistor G3 has no mass portion, the drain voltage thereof receives substantially no influence from acceleration. In addition, the operational amplifier 101 provides feedback to the gate voltage of a load 15A so that the drain voltage V3 is always equal to VDD/2. Since the same gate voltage is applied to the loads 15, the voltages V1 and V2 change around VDD/2, allowing operation in wider temperature ranges.

In any of the above-described embodiments, it is desirable to provide sufficient device separation for the active regions and signal processing and arithmetic portions on the substrate using normal semiconductor processes to eliminate noises from the signals for more accurate detection of acceleration.

The movable portion in this specification constitutes a portion which is displaced by acceleration to detect the acceleration and to generate a signal indicative of the same and which is comprised of movable gate electrodes of MISFETs and a retention movable electrode which receives the output signal and stabilizes the detection signal on a servo control basis. The differential output portion is comprised of a pair of MIS-type transistors having a movable gate, a component for obtaining a differential voltage using loads, and a differential amplifier portion, the differential output signal thereof being represented by ΔV.

For example, when applied to detection of crash of a vehicle air bag which is used in environments wherein the temperature greatly varies between the extremes and which is frequently subjected to fluctuations in the power supply battery, the device according to the present invention will not be erroneously activated by the acceleration occurring in response to the starting of the vehicle, vibrations or the like and will activate the air bag device properly by detecting only the acceleration produced by a crash in the direction of the crash.

While specific illustrated embodiments have been shown and described, it will be appreciated by those skilled in the art that various modifications, changes and additions can be made to the invention without departing from the spirit and scope thereof as set forth in the following claims.

What is claimed is:

1. An acceleration sensor comprising:
   a movable portion including movable gate electrodes which are supported by beams at a predetermined interval from the surface of a substrate and which are displaceable by acceleration applied thereto; and
   source and drain electrodes located relative to said movable gate electrodes so as to form a MIS-like structure for detecting acceleration acting on said movable gate electrodes,
   wherein said movable gate electrodes are arranged at said movable portion to form at least one pair of MIS-type transistors having the same characteristics,
   wherein an output portion is connected to said MIS-type transistors for producing an output signal changing in polarity depending on mutually opposite dynamic operation characteristics of said pair of MIS-type transistors in response to a movement of said movable portion caused by acceleration, and
   wherein a displacement control portion is connected between said output portion and said movable portion for performing displacement control based on said output signal so that the displacement of said movable portion is canceled by an electrostatic force having a sufficient magnitude to resist said acceleration.

2. The acceleration sensor according to claim 1,
   wherein said displacement control portion comprises a movable electrode serving as a weight at said movable portion and a first fixed electrode and a second fixed electrode on said substrate, and
   wherein the pair of said first fixed electrode and said second fixed electrode is arranged so as to sandwich said movable electrode with substantially equal gaps therebetween.

3. The acceleration sensor according to claim 1,
   wherein said displacement control portion is supplied with said output signal as a feedback to said movable portion.

4. The acceleration sensor according to claim 2,
   wherein said first and second fixed electrodes are supplied with a predetermined bias, and said output signal is fed back to said movable electrode to generate an electrostatic force at said movable electrode in the direction opposite to the acceleration which displaces said movable portion, thereby canceling said displacement.

5. The acceleration sensor according to claim 2,
   wherein said output signal is fed back to said first fixed electrode, an inverted signal obtained by inverting the polarity of said output signal is fed back to said second fixed electrode, and said movable electrode is kept at a predetermined electric potential, thereby generating an electrostatic force at said movable electrode in the direction opposite to the acceleration which has displaced said movable portion.

6. The acceleration sensor according to claim 1,
   wherein said beams are formed into a plurality of parallel double-end type beams to support said movable portion, said pair of movable gate electrodes is disposed in a gate-disposing direction which is horizontal with respect to said substrate surface and perpendicular to the direction of said beams, and said gate-disposing direction is the direction in which acceleration is detected.

7. The acceleration sensor according to claim 1,
   wherein a mass portion is provided on one side of one of double-end type beams as viewed in a direction perpendicular to the mounting direction thereof to form said movable portion for detecting acceleration in a direction perpendicular to said substrate surface,
   wherein said movable gate electrodes are disposed on both sides of said direction perpendicular to said beams symmetrically about said beam, and
   wherein said displacement control portion includes movable electrode arranged to be symmetric and substantially equal in surface area about said beams, and a first and second fixed electrodes on the substrate surface which face said movable electrode and which are formed to be axisymmetric about the position of said beam and substantially equal in surface area.

8. The acceleration sensor according to claim 1,
   wherein said output portion includes:
   a differential amplifier receiving outputs of said pair of MIS-type transistors and amplifying the difference between the outputs, and
   an integrator for integrating the outputs the result of the amplification.

9. The acceleration sensor according to claim 1,
   wherein said displacement control portion includes a plurality of sets of a movable electrode and a first and second fixed electrodes provided at said movable portion.

10. The acceleration sensor according to claim 6,
    wherein rectangular holes are formed in said movable portion, and a first and second fixed electrodes are provided at peripheral portions of the rectangular holes.

11. The acceleration sensor according to claim 1, wherein said output portion includes:

a comparator for performing conversion into a binary signal; and a signal processing portion for performing predetermined signal processing.

12. The acceleration sensor according to claim 11, wherein said signal processing portion converts said binary signal into a pulse-width-modulated pulse train and controls the displacement of said movable portion using said pulse train.

13. The acceleration sensor according to claim 11, wherein said signal processing portion converts said binary signal into a pulse-density-modulated pulse train and controls the displacement of said movable portion using said pulse train.

14. The acceleration sensor according to claim 11, wherein said signal processing portion includes:

an adder/subtracter circuit for performing addition and subtraction based on said binary signal; and a D-A converter for performing D-A conversion on the data output by said adder/subtracter circuit.

15. The acceleration sensor according to claim 1, wherein a terminal for sensitivity adjustment and a differential amplifier circuit are provided between an output terminal and said displacement control portion for performing sensitivity adjustment by applying a predetermined voltage.

16. The acceleration sensor according to claim 1, wherein a terminal for operation check and a third differential amplifier circuit are provided between an output terminal and said displacement control portion for checking operation by applying a predetermined signal to said terminal for operation check.

17. The acceleration sensor according to claim 1, wherein a terminal for offset adjustment is provided at said output portion.

18. The acceleration sensor according to claim 1, wherein a third MIS-type transistor which is not affected by acceleration and which has the same structure as said MIS-type transistors having the movable gate electrodes for detecting acceleration is provided in the vicinity of said MIS-type transistors, wherein MIS-type transistors serving as loads are connected to a drain of each of said MIS-type transistors, and wherein the operating points of the drain voltages of said MIS-type transistors are kept constant by controlling the gate voltages of the MIS-type transistors serving as loads so that the drain voltage of said MIS-type transistors is kept constant.

19. The acceleration sensor according to claim 1, wherein a switch is provided between said output terminal and said displacement control portion, which is switched so that said fixed electrodes and movable electrode have the same electric potential for a predetermined period of time.

\* \* \* \* \*